(12) United States Patent
Ward et al.

(10) Patent No.: US 6,312,638 B1
(45) Date of Patent: *Nov. 6, 2001

(54) PROCESS OF MAKING A COMPACTED POLYOLEFIN ARTICLE

(75) Inventors: Ian MacMillan Ward, Bramhope; Peter John Hine, Meanwood; Mark James Bonner, Leeds, all of (GB)

(73) Assignee: BTG International, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,255

(22) Filed: Apr. 2, 1999

Related U.S. Application Data

(63) Continuation of application No. PCT/GB97/02674, filed on Oct. 6, 1997.

(30) Foreign Application Priority Data

Oct. 4, 1996 (GB) .................................................. 9620691
Oct. 4, 1996 (GB) .................................................. 9620692

(51) Int. Cl.$^7$ .................................................. B29C 43/02
(52) U.S. Cl. .................................................. 264/322
(58) Field of Search .................................................. 264/322

(56) References Cited

U.S. PATENT DOCUMENTS

| | | |
|---|---|---|
| 3,997,386 | 12/1976 | Oshida et al. . |
| 4,048,364 | 9/1977 | Harding et al. . |
| 4,082,731 | 4/1978 | Knopka . |
| 4,110,391 | 8/1978 | Berzen et al. . |
| 4,228,118 | 10/1980 | Wu et al. . |
| 4,285,748 | 8/1981 | Booker et al. . |
| 4,403,012 | 9/1983 | Harpell et al. . |
| 4,413,110 | 11/1983 | Kavesh et al. . |
| 4,455,273 | 6/1984 | Harpell et al. . |
| 4,483,727 | 11/1984 | Eickman et al. . |
| 4,551,296 | 11/1985 | Kavesh et al. . |
| 4,568,581 | 2/1986 | Peoples, Jr. . |
| 4,786,348 | 11/1988 | Luise . |
| 4,923,660 | 5/1990 | Willenberg et al. . |
| 4,948,661 | 8/1990 | Smith et al. . |
| 4,990,204 | 2/1991 | Krupp et al. . |
| 5,006,390 | 4/1991 | Kavesh et al. . |
| 5,135,804 | 8/1992 | Harpell et al. . |
| 5,244,482 | 9/1993 | Hassenboehler, Jr. et al. . |

FOREIGN PATENT DOCUMENTS

| | | |
|---|---|---|
| 0116845A2 * | 8/1984 | (EP) . |
| 0 201 029 | 11/1986 | (EP) . |
| 2 253 420 | 9/1992 | (GB) . |

OTHER PUBLICATIONS

Japanese Patent Public Disclosure No. 2–229253 (1990).

* cited by examiner

Primary Examiner—Leo B. Tentoni
(74) Attorney, Agent, or Firm—Nixon & Vanderhye

(57) ABSTRACT

A polyolefin plaque is produced by hot compaction of an assembly of melt spun oriented fibres. It has been found that good compaction can be achieved at relatively low compaction pressures, less than 10 Pa. Compaction can be carried out in an autoclave, rather than in a hot compaction press, and the mechanical properties of plaques so produced range from good to excellent.

17 Claims, 3 Drawing Sheets

Flexural Properties Of Amoco 2036

PROCESS OF MAKING A COMPACTED POLYOLEFIN ARTICLE

This is a continuation of PCT application No. PCT/GB97/02674, filed Oct. 6, 1997.

This invention relates to processes for the production of polymer sheet materials from oriented olefin polymer fibres and to the products of such processes.

BACKGROUND OF THE INVENTION

U.S. Pat. No. 5,135,804 describes a 1-step compaction process for making a film, such as for a sail, from polyethylene fibres. The examples use a range of pressures, of from 4.6 MPa to 46 MPa. The process is exclusively for application to gel spun fibres having a weight average molecular weight of at least about 500,000, preferably at least about a million and more preferably between about 2 million and about six million.

It would be desirable to use a compaction process employing a low pressure, for example in an autoclave, for melt spun fibres but none is available. There are compaction processes for melt spun fibres, but they are 2-step processes, employing high compaction pressures.

DESCRIPTION OF THE INVENTION

There is a substantial body of literature about such processes, for example the following articles: "The hot compaction of high modulus melt-spun polyethylene fibres", Hine et al, Jnl. Materials Science 28 (1993), 316–324; "Morphology of compacted polyethylene fibres", R. H. Olley et al, Jnl. Materials Science 28 (1993), 1107–1112; "Compaction of high-modulus melt-spun polyethylene fibres at temperatures above and below optimum", M. A. Kabeel et al, Jnl. Materials Science 29 (1994), 4694–4699; "Differential melting in compacted high-modulus melt-spun polyethylene fibres", M. A. Kabeel et al, Jnl. Materials Science 30 (1995), 601–606; "The hot compaction of polyethylene terephthalate", J. Rasburn et al, Jnl. Materials Science 30 (1995), 615–622; "The hot compaction of polypropylene fibres", M. I. Abo El-Maaty et al, Jnl. Materials Science 31 (1996), 1157–1163.

GB 2253420B describes a 2-step compaction process whereby an assembly of fibres of an oriented polymer may be hot compacted to form a sheet having good mechanical properties. The process involves an initial processing step in which the fibres are brought to and held at the compaction temperature whilst subject to a pressure sufficient to maintain the fibres in contact, the contact pressure, and thereafter compacted at a higher pressure for a few seconds, the compaction pressure. In the process a proportion of the fibre surfaces—most preferably from 5 to 10% by weight—melts and subsequently recrystallises on cooling. This recrystallised phase binds the fibres together. The contact pressure is stated to be preferably in the range 0.5 to 2.0 MPa, and the compaction pressure 40 to 50 MPa.

We have now found that, surprisingly to us and quite unexpectedly in the light of the earlier work described above, melt spun polyolefin fibres can be compacted into monolithic articles by a process which does not require a high compaction pressure.

In accordance with a first aspect of the present invention there is provided a process for the production of a monolithic article in which process an assembly of melt formed fibres of an oriented polyolefin polymer is subjected to a compaction step wherein the assembly of fibres is maintained in intimate contact at an elevated temperature sufficient to melt a proportion of the polymer, and is subjected to a compaction pressure not exceeding 10 MPa.

In certain embodiments the process of the invention may employ a uniform pressure throughout.

In certain embodiments the process of the invention may involve a change in the pressure applied, but such that the maximum pressure applied is 10 MPa. In such embodiments a lower, contact, pressure may initially be applied, sufficient to maintain the fibres in contact, followed by the higher pressure, referred to as the compaction pressure.

Preferably the monolithic article is an article which is shape stable under its own weight, for example a plaque.

The term "melt formed fibres" is used herein in a broad sense to denote strands of polyolefin polymer, formed by any process in which the strands are formed via molten polymer. The melt formed fibres may be non-woven melt spun fibres laid in a web, or may be melt spun fibres comprised within yarns, or may be constituted by bands or fibrillated tapes, for example formed by slitting melt formed films. If comprised within yarns, or constituted by bands or fibrillated tapes, those yarns, bands or fibrillated tapes may be laid together or they may be formed into a fabric, for example by weaving or knitting.

Preferably the fibres used in the present invention have a weight average molecular weight in the range 10,000 to 400,000, preferably 50,000 to 200,000.

The polyolefin polymer can be selected from polyethylene, polypropylene or polybutylene, or copolymers comprising at least one of those olefin polymers. The polyolefin polymer used in the process of the present invention may suitably be a polypropylene homopolymer or a copolymer containing a major proportion of polypropylene. Advantageously it may be a polyethylene homopolymer or a copolymer containing a major proportion of polyethylene.

A polyethylene copolymer comprising a major proportion of polyethylene as defined herein is one comprising more than 50% by weight of polyethylene. Preferably, it comprises more than 70% by weight of polyethylene, most preferably, more than 85% by weight of polyethylene.

A polyethylene polymer as defined herein may be unsubstituted, or substituted, for example by halogen atoms, preferably fluorine or chlorine atoms. Unsubstituted polyethylene polymers are however preferred.

A polyethylene copolymer comprising a major proportion of polyethylene may have one or more different copolymers, following copolymerisation of ethylene with, for example, one or more of propylene, butylene, butadiene, vinyl chloride, styrene or tetrafluoroethylene. Such a polyethylene copolymer may be a random copolymer, or a block or graft copolymer. A preferred polyethylene copolymer is a propylene-ethylene copolymer, having a major proportion of polyethylene and a minor proportion of polypropylene.

A polypropylene copolymer comprising a major proportion of polypropylene as defined herein is one comprising more than 50% by weight of polypropylene. Preferably, it comprises more than 70% by weight of polypropylene, most preferably, more than 85% by weight of polypropylene.

A polypropylene polymer as defined herein may be unsubstituted, or substituted, for example by halogen atoms, preferably fluorine or chlorine atoms. Unsubstituted polypropylene polymers are however preferred.

A polypropylene copolymer comprising a major proportion of polypropylene may have one or more different copolymers, following copolymerisation of propylene with, for example, one or more of ethylene, butylene, butadiene, vinyl chloride, styrene or tetrafluoroethylene. Such a polypropylene copolymer may be a random copolymer, or a block or graft copolymer. A preferred polypropylene copolymer is a propylene-ethylene copolymer, having a major proportion of polypropylene and a minor proportion of polyethylene.

An inorganic filler material may be present. An inorganic filler material, when present, may be present in an amount up to 60 vol % of the article, preferably 20 to 50 vol %. An inorganic filler material may, for example, be selected from silica, talc, mica, graphite, metal oxides, carbonates and hydroxides and apatite, for example hydroxyapatite, a biocompatible calcium phosphate ceramic.

In accordance with the present invention there is provided a polyolefin polymer monolith prepared in accordance with the process of the invention, as defined above.

In relation to the compaction the description in GB 2253420B is still broadly applicable to the modified process of the present invention, for example in relation to treatment times, temperatures, proportion of material which is to melt, the assembly of the fibres and molecular weights and the description of GB 2253420B may be regarded as incorporated into the present specification by reference, insofar as it applies to the production of polyolefin articles. However the pressure conditions are different, as described below.

In compactions in accordance with the present invention the compaction pressure applied (which is the single pressure applied in one-step processes or the maximum pressure applied in two or multi-step processes) is suitably in the range 0.1 to 10 MPa, preferably 0.2 to 5 MPa, most preferably 0.3 to 4 MPa. It is especially preferred that the pressure, or maximum pressure, is such that the process may be carried out in an autoclave or in a belt press or other apparatus in which the assembly is fed through a compaction zone in which it is subjected to said elevated temperature and said pressure. Thus, the process may be operated as a continuous or semi-continuous process.

A further difference between the present invention and that of GB 2253420B is that in the process of the invention the proportion of the polymer which melts is suitably 10 to 50% by weight.

In accordance with a second aspect of the present invention there is provided a process for the production of a monolithic article in which process an assembly of melt formed fibres of an oriented polyolefin polymer is subjected to a compaction process in which the assembly of fibres is maintained in intimate contact at an elevated temperature sufficient to melt a proportion of the polymer, and is simultaneously subjected to a single pressure throughout the process.

If wished the fibres may have been subjected to a crosslinking process. It has been found that this can improve the compaction process by making the compaction temperature less critical, and can favourably alter some mechanical properties, in particular by improving failure strength at elevated temperatures.

When a prior crosslinking process is employed it may be a chemical crosslinking process, involving the use of a chemical reagent which forms reactive radicals under predetermined initiation conditions. Suitably the reagent may be a cumene compound, or a peroxide, for example DMTBH or DCP, or a silane, for example a vinyl silane, preferably vinylmethoxy silane. More preferably it may be an irradiation crosslinking process involving an ionising step comprising irradiating the fibres with an ionising radiation, and then an annealing step comprising annealing the irradiated polymer at an elevated temperature. Irradiation crosslinking is believed to be particularly suitable.

For general information on known crosslinking processes, reference may be made to Sultan & Palmlöf, "Advances in Crosslinking Technology", Plast. Rubb. and Comp. Process and Appl., 21, 2, pp. 65–73 (1994), and to the references therein.

A preferred irradiation crosslinking process will now be further defined.

Suitably, the environment for the annealing step which preferably follows irradiation is a gaseous environment.

Preferably the irradiation step is effected in an environment which is substantially free of oxygen gas. For example it could be performed in vacuo or in the presence of an inert liquid or gas. Preferably however the environment for the irradiation step comprises a monomeric compound selected from alkynes, and from alkenes having at least two double bonds.

Preferably, the annealing step which follows irradiation is carried out in an environment which is substantially free of oxygen gas but which comprises a monomeric compound selected from alkynes, and from alkenes having at least two double bonds.

There is no necessity for the environments to be the same, in the irradiation and annealing steps. Indeed there is no necessity for said monomeric compound used during the irradiation step to be the same as said monomeric compound used in the annealing step; the monomeric compound used in the irradiation step could be replaced in whole or in part by a different monomeric compound for the annealing step. However it is believed that the properties desired of said monomeric compound in the irradiation step will generally be the same as those required in the annealing step, so there will generally be no necessity to effect a whole or partial replacement. Most conveniently, therefore, the monomeric compound is the same throughout. In some cases however it may be advantageous to supply a further charge of said monomeric compound, as the process proceeds.

For either or both steps, a mixture of monomeric compounds could be employed.

The environment employed for the irradiation and/or the annealing steps is preferably constituted entirely by said monomeric compound, but may also comprise a mixture being said monomeric compound together with one or more other components, for example an inert gas or liquid. Suitably the said monomeric compound is gaseous at least under the treatment conditions employed and is employed in the irradiation and/or annealing steps at a pressure, or partial pressure in the case of a mixture, in the range of 0.2–4 atmospheres ($2\times10^4$Pa–$4\times10^5$Pa), preferably 0.3–2 atmospheres ($3\times10^4$Pa–$2\times10^5$Pa), most preferably 0.5–1 atmospheres ($5\times10^4$Pa–$1\times10^5$Pa).

Preferred monomeric compounds for use in the present invention, in either or both of the irradiation and annealing steps, are alkynes, and alkenes having at least two double bonds, which alkenes are not substituted by halogen atoms. They are desirably gaseous under the treatment conditions employed and should be able to diffuse into the polyolefin polymer under the treatment conditions employed. Preferred are unsubstituted alkynes or alkenes i.e. alkynes or alkenes made up substantially entirely by hydrogen and carbon atoms. Examples are unsubstituted $C_{2-6}$ alkynes, preferably having only one triple bond, for example acetylene, methyl acetylene, dimethyl acetylene and ethyl acetylene (of which species acetylene is preferred) and unsubstituted $C_{4-8}$ alkenes having at least two double bonds, preferably only two double bonds, for example 1,3-butadiene, 1,3-pentadiene, 1,3-hexadiene, 1,4-hexadiene and 1,3,5-hexatriene (of which species 1,3-butadiene is preferred).

One preferred class of alkenes for use in the present invention has at least two conjugated double bonds, thus including 1,3-butadiene, 1,3-pentadiene, 1,3-hexadiene and 1,3,5-hexatriene. Preferably the conjugation extends throughout the length of the compound, as is the case with 1,3-butadiene and 1,3,5-hexatriene.

Another preferred class of alkenes for use with the present invention has double bonds at least as the terminal bonds in the compounds, thus including 1,3-butadiene and 1,3,5-hexatriene.

A particularly preferred class of alkenes has at least two conjugated double bonds, preferably with the conjugation extending throughout the length of the compounds, and double bonds at least as the terminal bonds of the compounds. Compounds of this type thus include 1,3-butadiene and 1,3,5-hexatriene.

Preferably said alkyne or alkene having at least two double bonds is the sole crosslinking agent employed in the irradiation step and/or the annealing step.

Acetylene is an especially preferred monomeric compound for use in the present invention. Preferably acetylene is used as substantially the sole said monomeric compound both in the irradiation step and in the annealing step.

Suitably the irradiation step is effected at a temperature not exceeding 100° C., preferably not exceeding 80° C. A preferred range is 0–50° C., most preferably 15–30° C. Conveniently the step is effected at ambient temperature.

In carrying out the process of this invention, any ionizing radiation can be employed. In practice, however, the types of ionizing radiation which can be used with greatest practicality are electron beams, ultra-violet radiation and, especially, γ-rays.

The radiation dose is suitably in the range 0.5 to 100 MRads inclusive, preferably 1 to 50 MRads inclusive, most preferably 2 to 20 MRads inclusive. For many applications a radiation dose of 3 to 10 MRads inclusive appears very favourable.

Preferably the polyolefin polymer is annealed at a temperature of at least 60° C., preferably at a temperature in the range 80 to 120° C. inclusive.

Preferably the polyolefin polymer is annealed at an annealing temperature at least 20° C. below its melting point, most preferably at an annealing temperature which is below its melting point by a temperature differential in the range 20 to 50° C., inclusive, most preferably, 30 to 40° C., inclusive.

The period for which annealing is carried out is not thought to be critical, provided that the time is sufficient for substantially all of the polymer which has been irradiated to reach the said annealing temperature and for substantially all of the radicals formed to have reacted. This can be assessed by trial and error following ESR or mechanical testing of irradiated and annealed samples; the presence of unreacted radicals is believed to lead to chain scission and diminution in mechanical properties.

Suitably the polyolefin polymer after the irradiation and annealing steps has a gel fraction at least 0.4, preferably at least 0.5. Preferably the polyolefin polymer after the irradiation and annealing steps has a gel fraction no greater than 0.85, preferably no greater than 0.75. A particularly preferred gel fraction is in the range 0.55 to 0.7, most preferably 0.6 to 0.65.

The process of the present invention is a simple low pressure process giving mechanical properties which range from good to excellent. In particular, the impact resistance of polypropylene plaques produced by the process of the invention is outstanding.

BRIEF DESCRIPTION OF THE DRAWINGS

The invention will now be described in more detail with reference to the accompanying drawings, in which.

EXAMPLES

The invention will now be further described, by way of example, with reference to the examples which follow.

Polyethylene Examples

Sample

In the first examples, the material used was a commercially available oriented melt spun homopolymeric polyethylene, sold as a 250 denier multifilament yarn, under the Trade Mark CERTRAN. The polyethylene of CERTRAN is characterised as follows:

| Molecular Weight | | | Breaking Strength | Tensile Modulus Initial | |
|---|---|---|---|---|---|
| (Mw) | (Mn) | Process | (GPa) | Secant (GPa) | 2% (GPa) |
| 130,000 | 12,000 | melt spun | 1.3 | 58 | 43 |

Experimental

Samples were prepared in a 55 mm square mould in a bench press. 10 layers of CERTRAN woven cloth were assembled between aluminium sheets in the mould and then placed in the press. The contact pressure was applied and maintained as the assembly heated up. The assembly was given a 5 minute contact period under the contact pressure starting from the point where 138.0° C. was achieved. The temperature during the contact period was maintained between 138.0° C. and 139.0° C. After the contact period the compaction pressure was applied. In some cases this was the same as the contact pressure, and in some cases higher. The compaction pressure was maintained as the assembly was cooled to 100.0° C. in the press, at which point the pressure was removed and the assembly cooled to room temperature in air.

Testing

The longitudinal flexural modulus and longitudinal flexural strength of the samples were tested. Two strips were cut from each plaque and tested as follows.

Due to size limitations the plaques could not be tested to ASTM standards. The equipment used was compliant with ASTM D790, and three point bending was used as described in method 1 of this standard. The dimensions of the specimens were

| | |
|---|---|
| Span | 30 mm |
| Width | 10 mm |
| Thickness | governed by plaque |

In general the thickness to span ratio was around 16 to 1. The rate of crosshead motion was 1 mm per minute in all cases.

Initial longitudinal flexural modulus was determined by taking the slope of the initial part of the curve (with due allowance for "toe in"), and using the following formula $$\text{Modulus} = \left(\frac{\text{Load}}{\text{Deflection}}\right) \times \left(\frac{\text{Span}}{4 \times \text{Thickness}^3 \times \text{Width}}\right)$$

Flexural strength was determined by taking the peak load before failure and using the following formula $$\text{Strength} = \frac{6 \times \text{Load} \times \text{Span}}{4 \times \text{Width} \times \text{Thickness}^2}$$

Errors quoted are derived from the following formula $$e = \frac{\text{Standard deviation}}{\sqrt{\text{number of samples tested}}}$$

Figure 1:
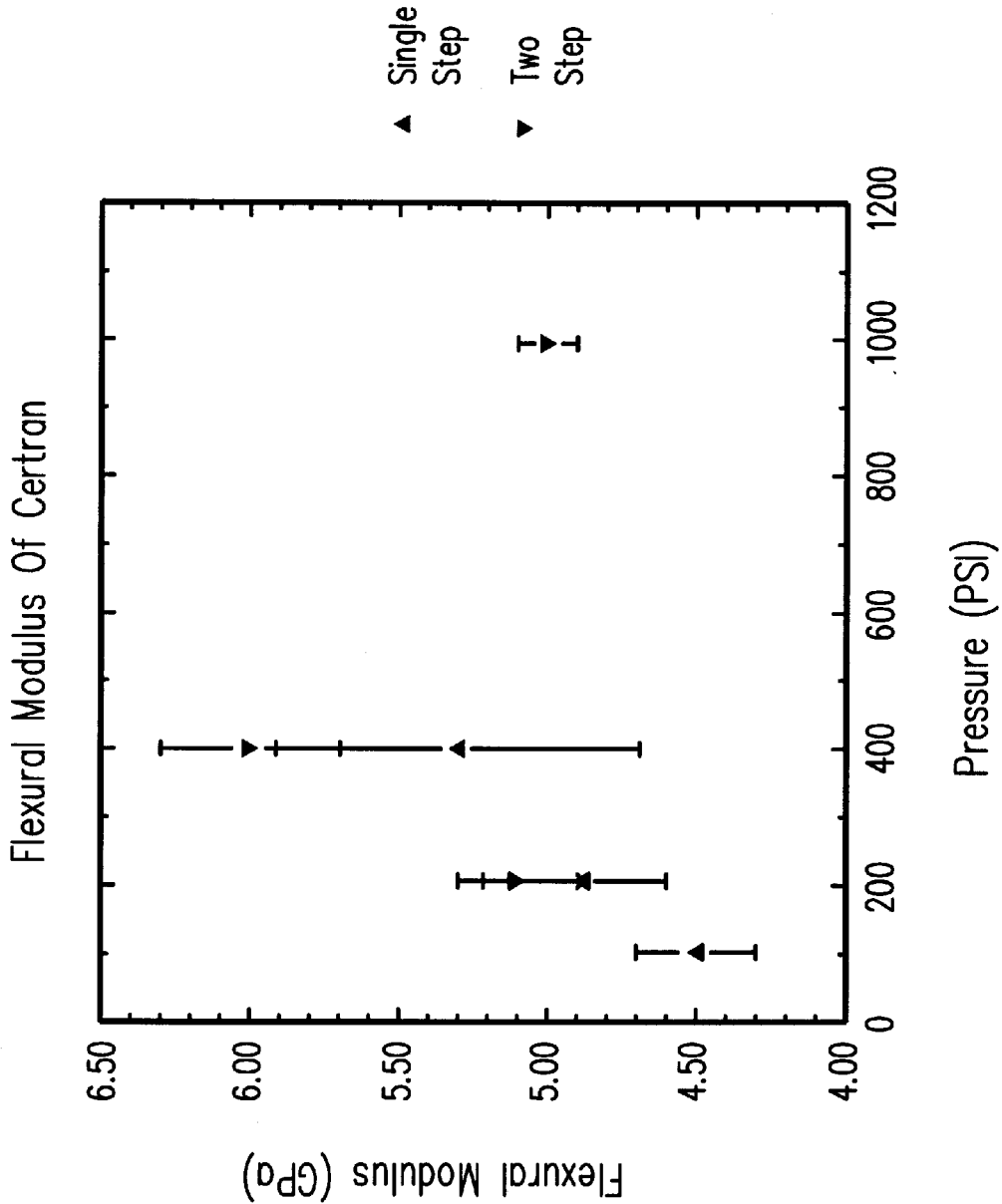
FIG. 1 is a plot of flexural modulus against pressure for CERTRAN.
Figure 2:
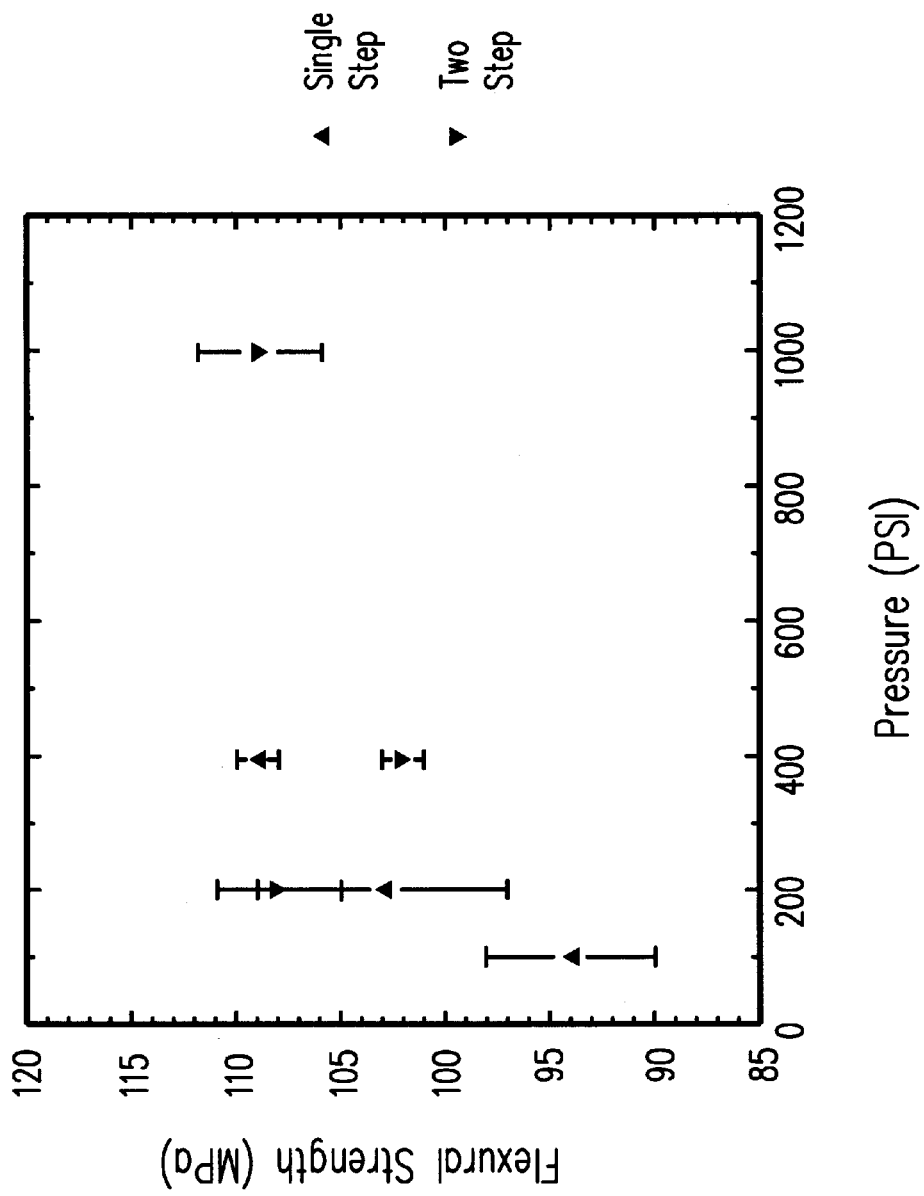
FIG. 2 is a further plot of flexural strength against pressure for CERTRAN.

The results are shown in Table 1 below and FIGS. 1 and 2. In FIGS. 1 and 2 the first pressure for a two-stage result is always 0.7 MPa.

TABLE 1

| Contact Pressure (MPa) | Compaction Pressure (HPa) | Longitudinal Flexural Modulus (GPa) | Longitudinal Flexural strength (MPa) |
|---|---|---|---|
| 0.7 | 0.7 | 4.5 ± 0.2 | 94 ± 4 |
| 1.35 | 1.35 | 4.9 ± 0.3 | 103 ± 6 |
| 2.7 | 2.7 | 5.3 ± 0.6 | 109 ± 1 |
| 0.7 | 1.35 | 5.1 ± 0.2 | 108 ± 3 |
| 0.7 | 2.7 | 6.0 ± 0.3 | 102 ± 1 |
| 0.7 | 6.9 | 5.0 ± 0.1 | 109 ± 3 |

Figures underlined are the average of the 6 separate mechanical tests (2 strips machined from 3 plaques); figures not underlined are the average of 2 tests (2 strips from a single plaque).

Experiments have also been performed to compare the performance of samples produced in a matched metal mould, using a two-stage process, and in a press clave (a type of autoclave), using a relatively low range of compaction pressures.

In these experiments 12 layers of CERTRAN were laid in a matched metal mould or a press clave. The contact pressure was applied as the assembly heated up, and the assembly was given a ten minute contact time once the temperature had reached 137.5° C. This temperature was maintained constant during the contact time. The compaction pressure was then applied for one minute before the assembly was cooled as before. The results from tests performed as described previously are shown in Table 2 below.

TABLE 2

| Process | Contact Pressure (MPa) | Compaction Pressure (MPa) | Longitudinal Flexural Modulus (GPa) |
|---|---|---|---|
| Matched metal mould | 0.7 | 6.9 | 9.87 ± 0.54 |
| Press | 0.7 | 1.35 | 9.86 ± 0.26 |
| Clave | 0.7 | 0.7 | 9.73 ± 0.40 |
| | 1.35 | 1.35 | 9.70 ± 0.10 |

Note

The moduli quoted in Table 2 are higher than those quoted in Table 1 because of the lower compaction temperature used in producing the material used in the tests of Table 2. Reducing the compaction temperature reduces the proportion of the fibre melted, which means that the moduli are higher since more of the original oriented fibre remains. A second reason is that the Table 2 tests used a sample of 100 mm span whereas the Table 1 tests used a sample of 30 mm span, causing shear effects in the latter. Such shear effects cause a reduction in the modulus measured.

Provisional Conclusions

A single pressure process performed at a pressure of 0.7 MPa produces samples with good flexural properties. If the pressure is increased then the evidence points to an improvement in properties, which approaches the values seen with a two-stage process.

Polypropylene Examples

Sample

The compaction behaviour of a polypropylene fabric with a relatively high initial modulus was studied. The polymer fabric chosen for study was AMOCO fabric type 2036. This is woven from polypropylene tapes, the same type for both warp and weft, with an initial tensile modulus of 4.8±0.2 GPa. The tapes are formed by slitting a drawn polypropylene film, in standard manner.

Experimental

Initial compaction trials were performed using the 55 mm square mould in a bench press as described above. The assembly was held at the contact pressure during initial heating until the temperature had reached 182.0° C. At this point the assembly was held for ten minutes, with the temperature being maintained between 182.0° C. and 183.0° C. The compaction pressure was then applied, and the assembly cooled under the compaction pressure to 100° C. At this point the assembly was removed from the press and cooled to room temperature in air with no pressure applied. In most cases the compaction pressure was equal to the contact pressure, but a test using a two-step process involving a substantially higher compaction pressure was also performed.

Figure 3:
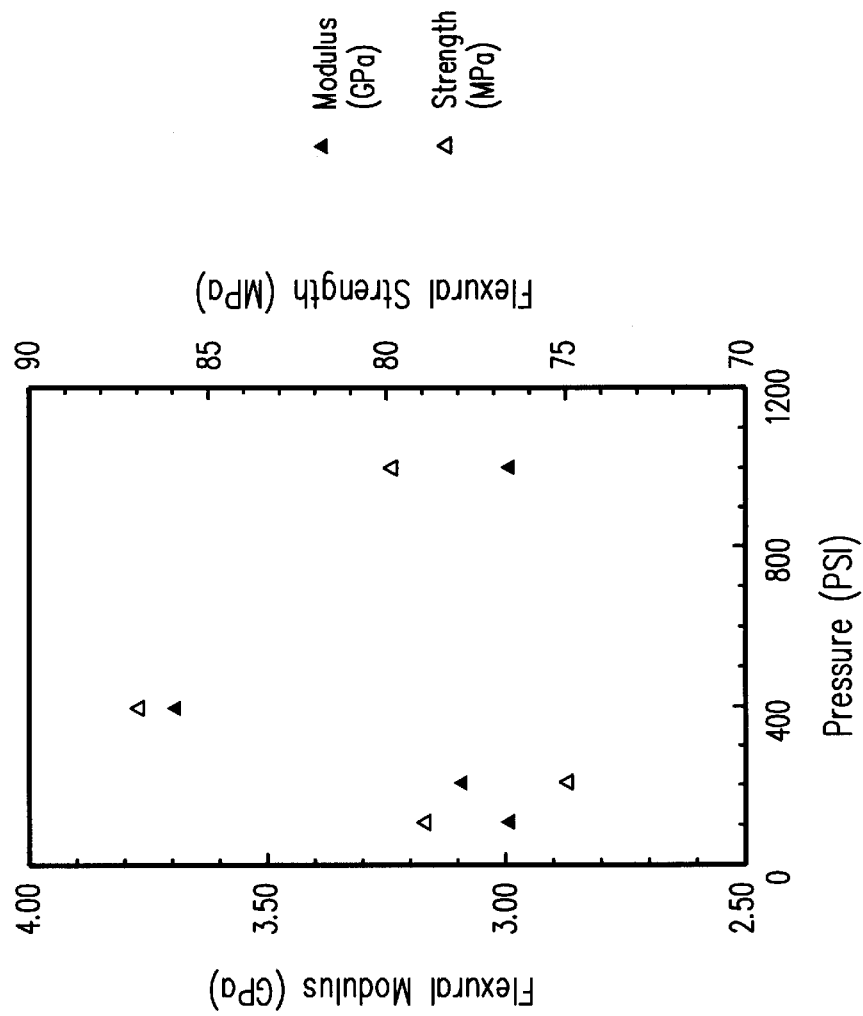
FIG. 3 is a plot of flexural modulus against pressure for AMOCO 2036.

Flexural modulus and strength tests were performed as described previously. The results are shown in Table 3 and FIG. 3 below.

TABLE 3

| Contact Pressure (MPa) | Compaction Pressure (HPa) | Longitudinal Flexural Modulus (GPa) | Longitudinal Flexural Strength (MPa) |
|---|---|---|---|
| 0.7 | 6.9 | 3.6 | 87 |
| 0.7 | 0.7 | 2.9 | 80 |

TABLE 3-continued

| Contact Pressure (MPa) | Compaction Pressure (HPa) | Longitudinal Flexural Modulus (GPa) | Longitudinal Flexural Strength (MPa) |
|---|---|---|---|
| 1.35 | 1.35 | 3.0 | 68 |
| 2.7 | 2.7 | 3.7 | 87 |
| 6.9 | 6.9 | 3.0 | 80 |

Provisional Conclusions for Polypropylene

Reasonable properties can be obtained using a single pressure process at 0.7 MPa. Better properties for a single pressure process are achieved using a single pressure of 2.7 MPa.

Polypropylene Impact Tests

A 6 mm thick, 180 mm square panel of compacted AMOCO polypropylene woven fabric 2036 formed from tapes was prepared for IZOD impact tests. The manufacturing procedure was as follows. The required number of layers of polypropylene cloth were placed into a matched metal mould which was set to the compaction temperature of 183° C. A pressure of 2.7 MPa was applied to the mould, and once the assembly had reached the compaction temperature it was left for 10 minutes. A pressure of 6.9 MPa was then applied for 1 minute, after which the sample was cooled to 90° C. The pressure was then released and the sample was removed from the mould. The IZOD tests were performed according to ASTM D256 test method A. The results from six tests gave an average value of the impact energy of 3090±660 J/m.

Polypropylene Continuous Process Example

Experiments were carried out to assess the suitability of a single step compaction procedure for a continuous process. The tests were carried out using a double belt press manufactured by Hymmen GmbH, of Bielefled, Germany. The press was set to a temperature of 183° C., and for a pressure of 0.7 MPa. The press was able to receive material 600 mm wide.

The material used for these tests was a woven fabric available from Amoco Industries as Propex Geotextile fabric type 6082. This is woven from tapes which have a tensile strength of 40 kN/m (measured by test standard DIN-EN-964-1). The tapes are produced by slitting a drawn film in standard manner, and are used for warp and weft. Initial experiments were carried out using two layers of the woven cloth, with the press running at a speed of approximately 1 metre/minute. Successful hot compaction was achieved using these parameters, with well compacted sheet produced on a continuous basis for over an hour at a speed of 1 metre/minute. Subsequent trials using four layers of woven polypropylene cloth were also successful using the same process parameters.

Dumbbell-shaped samples of 26 mm gauge length were cut from the compacted sheets and tensile modulus and strengths were determined at 20° C. using tests performed at a nominal strain rate of 20% per minute. Table 4 below shows a comparison of these results with measurements on samples cut from material compacted in an autoclave using a single pressure of 0.7 MPa, and samples cut from material made using a matched metal mould in a single pressure process of 0.7 MPa.

TABLE 4

|  | Belt Press | Autoclave | Matched metal mould |
|---|---|---|---|
| Tensile Modulus (GPa) | 3.5 ± 0.1 | 3.2 ± 0.1 | 35 ± 0.1 |
| Tensile Strength (MPa) | 112 ± 6 MPa | 117 ± 10 | 106 ± 7 |

Provisional Conclusions

The continuous process makes material that has equivalent tensile properties to the batch processes.

Compaction of Crosslinked CERTRAN

The above experiments were carried out on polyolefins which had not undergone any pre-treatment. If wished the polyolefins can be given a cross-linking pretreatment. We have found that prior cross-linking may make processing easier by reducing the criticality of the moulding temperature, as well as improving certain mechanical properties. Preferred cross-linking is carried out by irradiating in acetylene at ambient temperature and then annealing in acetylene at an elevated temperature. Accordingly the following experiments were carried out.

10 kg of woven CERTRAN cloth, 107 cm wide, was placed in a purpose built cylinder, which was first evacuated and then pressurised to $6\times10^4$Pa with acetylene. Irradiation was carried out using γ radiation to a dose of 1.8 MRad at ambient temperature. After irradiation the cylinder and cloth were repressurised to $6\times10^4$Pa with acetylene and annealed at 90° C. for 8 hours. After annealing the cloth was removed from the cylinder and scoured to remove any by-products of the crosslinking process. In addition it was found that optimum compaction was achieved if the surface of the cloth was lightly abraded over a sandpaper covered roller to further remove any crosslinking by-products. The gel content of the crosslinked cloth was measured to be 62%.

Compaction experiments were carried out at 144° C. using a single stage process with a pressure of 0.7 MPa used throughout. Dumbbell-shaped samples were cut from the compacted sheets and tensile modulus and strength were determined at 20° C. and 80° C., using tests performed at a nominal strain rate of 20% per minute. Table 5 below shows a comparison of these results with results of compacted crosslinked CERTRAN cloth using a two stage process (compaction temperature 144° C., contact pressure 0.35 MPa and compaction pressure 7 MPa, also lightly abraded before compaction) and results of compacted non-crosslinked CERTRAN cloth (compaction temperature 139° C., contact pressure 0.7 MPa and compaction pressure 7 MPa, non-abraded).

Gel content was measured by the method described in the Journal of Polymer Science: Part B: Polymer Physics, 1993, Vol. 13, p. 809 (R. A. Jones, G. A. Salmon, I. M. Ward).

TABLE 5

|  | Non-crosslinked | Crosslinked | Crosslinked |
|---|---|---|---|
| Compaction Temperature | 139° C. | 144° C. | 144° C. |
| Contact pressure | 0.7 MPa | 0.35 MPa | 0.7 MPa |
| Compaction pressure | 7 MPa | 7 MPa | 0.7 MPa |
| Tensile Modulus (20° C.) | 10.0 GPa | 9.8 GPa | 10.1 GPa |
| Tensile Strength (20° C.) | 200 MPa | 200 MPa | 220 MPa |

TABLE 5-continued

|  | Non-crosslinked | Crosslinked | Crosslinked |
|---|---|---|---|
| Compaction Temperature | 139° C. | 144° C. | 144° C. |
| Contact pressure | 0.7 MPa | 0.35 MPa | 0.7 MPa |
| Compaction pressure | 7 MPa | 7 MPa | 0.7 MPa |
| Tensile Modulus (80° C.) | 2.7 GPa | 5.3 GPa | not measured |
| Tensile Strength (80° C.) | 20 MPa | 100 MPa | 107 MPa |

What is claimed is:

1. A process for the production of a monolithic article, said process comprising subjecting an assembly of melt formed fibers of an oriented polyolefin polymer to a compaction process wherein the assembly of fibers is (a) maintained in intimate contact at an elevated temperature such as to melt at least 10% but no more than 50% by weight of the polymer, and (b) subjected to a compaction pressure of from 0.1 to 10 MPa such that the monolithic article is produced.

2. A process as claimed in claim 1, wherein the fibres have a weight average molecular weight in the range 10,000 to 400,000.

3. A process as claimed in claim 2, wherein the fibres have a weight average molecular weight in the range 50,000 to 200,000.

4. A process as claimed in claim 1, wherein the polyolefin polymer is selected from the group consisting of polypropylene homopolymer, a copolymer containing a major proportion of polypropylene, polyethylene homopolymer and a copolymer containing a major proportion of polyethylene.

5. A process as claimed in claim 1, which process employs an inorganic filler material, such that the filler is present in the compacted monolithic article in an amount up to 60 vol % of the article.

6. A process as claimed in claim 1, wherein the pressure is in the range 0.2 to 5 MPa.

7. A process as claimed in claim 6, wherein the pressure is in the range 0.3 to 4 MPa.

8. A process as claimed in claim 1, wherein the assembly of fibres is subjected to a single pressure during the process.

9. A process as claimed in claim 1, wherein the process is carried out in an autoclave.

10. A process as claimed in claim 1 wherein the process is carried out using apparatus which has a compaction zone and means for feeding the assembly of fibres through the compaction zone, in which the assembly of fibres is subjected to said elevated temperature and said pressure.

11. A process as claimed in claim 1, wherein the proportion of the polymer which melts during the compaction stage is 10 to 50% by weight.

12. A process for the production of a monolithic article, said process comprising subjecting an assembly of melt formed fibers of an oriented polyolefin polymer to a compaction process in which the assembly of fibers is maintained in intimate contact at an elevated temperature such as to melt at least 10% but no more than 50% by weight of the polymer, and is subjected to a single pressure of between 0.1 and 10 MPa throughout the process.

13. A process for production of a sheet material which process comprises subjecting an assembly melt formed fibers of a molecularly oriented polyolefin polymer to a compaction process wherein the assembly of fibres is (a) maintained in intimate contact at an elevated temperature such as to melt at least 10% but no more than 50% by weight of the polymer and (b) subjected to a compaction pressure of from 0.1 to 10 MPa such that the sheet material is produced.

14. A process as claimed in claim 1 wherein the polymer is polypropylene and the elevated temperature is about 182° C.

15. A process as claimed in claim 13 wherein the polymer is polypropylene and the elevated temperature is about 182° C.

16. A process as claimed in claim 1 wherein the polymer is polyethylene and the elevated temperature is about 137.5 to 139° C.

17. A process as claimed in claim 13 wherein the polymer is polyethylene and the elevated temperature is about 137.5 to 139° C.

* * * * *